INVENTORS
JOSEPH C. MARSHALL
JOHN J. CONNOLLY
ATTORNEY

Sept. 2, 1952 — J. C. MARSHALL ET AL — 2,609,439
INDICATOR SETTING MECHANISM OPERABLE BY MEANS OF CHARACTER COMPARISONS

INVENTORS
JOSEPH C. MARSHALL
JOHN J. CONNOLLY

Patented Sept. 2, 1952

2,609,439

UNITED STATES PATENT OFFICE 2,609,439

INDICATOR SETTING MECHANISM OPERABLE BY MEANS OF CHARACTER COMPARISONS

Joseph C. Marshall, Baldwin, and John J. Connolly, New York, N. Y., assignors to The Teleregister Corporation, New York, N. Y., a corporation of Delaware Application September 20, 1949, Serial No. 116,752

11 Claims. (Cl. 177—353)

1

This invention relates to an indicator setting and check-back circuit arrangement, such as may be used in electrical and cyclical data posting systems.

In the general class of apparatus for display board operation to post statistical data it is frequently the case that the posting data signals are received more rapidly than can be handled by electro-mechanically operated indicators. In order, therefore, to meet the requirements for translating rapidly received data signals into indicator posting control signals, we have adopted the technique of first storing the signals on a magnetic drum or tape, then utilizing an iterative read-out of the signals to trigger certain control mechanism having as its function to operate an indicator stepping device for moving the indicator from one step to another, this operation being repeated as many times as may be necessary to step the indicator from its previous posting position to a new posting position.

Our invention is intended to be used under conditions which may be similar to those described in a patent of Harold F. May, No. 2,564,403, issued August 14, 1951. In May's disclosure the system described had a very different mode of operation from the one which we shall set forth in this case. May, in his system, requires the use of certain components which we have found unnecessary to employ. The circuit arrangement which will presently be described is one that lends itself to more rapid operation and provides other advantages as well. We have also disclosed an arrangement for reporting back to the source of signals a read-out of the indicator settings for which the original signals may have been transmitted in the first place. This check-back system, insofar as we are aware, is one which possesses numerous novel aspects.

In describing our invention we shall cover generally a method of first recording the received signals on a magnetic storage medium and then producing a read-out of these recorded signals under control of synchronous pulses. A comparator operating in response to marking code elements derived from the read-out and in response to indicator-derived space code elements initiates an indicator setting operation whenever the marking elements of the stored signal fail to

2 dovetail with spacing elements of a code which represents the indicator's position of orientation. We wish it to be understood, however, that our invention may be practiced independently of a magnetic storage medium, provided the incoming signals can be iteratively transmitted and received at a fixed cadence so as to enable cyclical operation of the various parts of the system which must be sequentially operated. The use of a constantly revolving drum have a recording path for the data signals and another record path from which synchronizing pulses may be derived at a fixed cadence illustrates, in simple fashion, how the signals may best be translated into indicator setting pulses. This is especially true in respect to systems in which a plurality of indicators is used.

It is an object of our invention to provide translating means and an indicator setting circuit arrangement which will handle incoming code signals, or signals derived from a magnetic drum at a very rapid rate, and which will concurrently set and reset different indicator units in accordance with the read-out of information from a magnetic drum.

Another object of our invention is to provide an indicator posting mechanism and a circuit arrangement therefor, in combination with a magnetic data storage drum with associated recording and reading heads, the novel portions of the system including means for making comparisons between two code combinations, one of which, on the one hand, is represented by the read-out from magnetic storage of a 5-unit code, and on the other hand, a code representation corresponding to the current setting of an indicator drum.

Still another object of our invention is to provide a commutator and brush arrangement associated with each indicator of a posting board, this arrangement being adapted to present for comparison purposes the necessary elements of a code combination so that a signal to be utilized for posting purposes, lacking agreement therewith, will effect a setting operation upon the indicator to give it one step.

Another object of our invention relates to improvements in systems for transmitting a check-back signal to the original source of the posting signals for the purpose of comparing the setting of each indicator in the posting board with a record at said source.

In carrying out our invention, we have found it desirable to use what is known as a safety code. This is a code wherein each permutation has a uniform number of marking elements and a uniform number of spacing elements. The advantages of using this code are that any mutilation of the code which may be caused, say, by a static pulse in radio transmission, will immediately become apparent and will avoid misleading anyone who might otherwise read an erroneous setting of the indicator. In the system as herein illustrated, the transmission of a 5-unit code containing more than three marking elements would result in the failure of the selected indicator to come to rest. This continuous response to the mutilated signal in an attempt to find a resting point would give warning that the posting signal should be repeated correctly.

Another feature of our invention relates to the use of a comparator for determining when an indicator should be reset to agree with a magnetically stored signal. Our preferred comparator checks the code elements serially. Any failure of correspondence between the stored signal and the current indicator setting must result in control of the setting mechanism to rotate the indicator one step. Further steps may be taken for cyclically advancing the indicator into a position corresponding to the significance of the incoming code signal.

Our invention will now be described in more detail, reference being made to the accompanying drawing in which.

The data storage device

Figure 1:
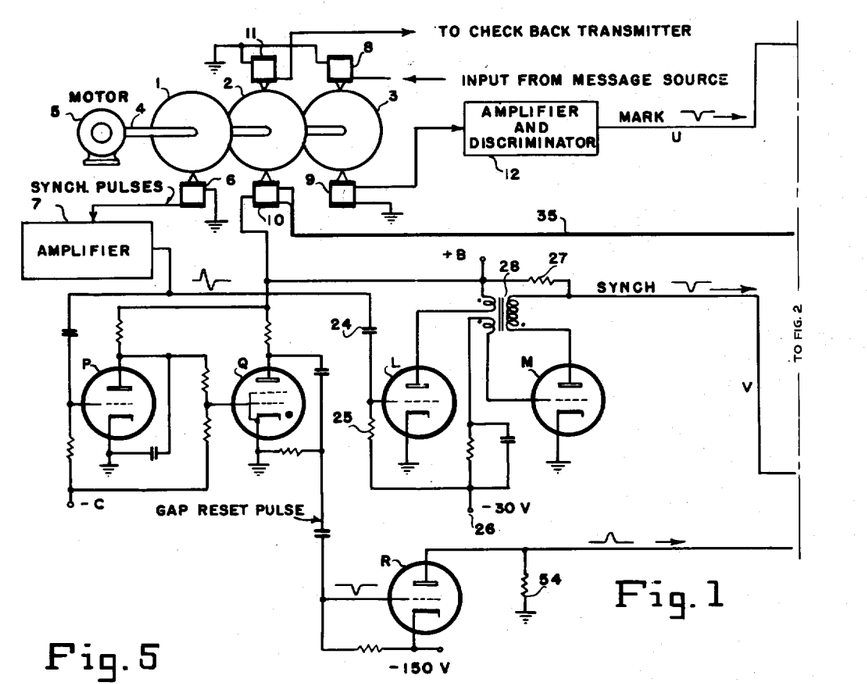
Figs. 1, 2 and 3 taken together and laid in the order named from left to right, represent a schematic circuit diagram of electrically and cyclically operable posting means of the type herein above described.

Referring to Fig. 1 we show therein three components 1, 2 and 3 of a magnetic data storage unit. These components may be separate discs mounted on a common shaft 4, driven by a motor 5. On the other hand, the elements 1, 2 and 3 may typically represent different peripheral recording paths on a cylindrical drum which has its cylindrical surface coated with magnetic material. Magnetic storage devices, whether of disc form or of drum form, are well known in the art and do not need further description herein.

This disc or recording path 1 is utilized for synchronizing purposes and will therefore be assumed to have a record thereon of evenly-spaced spots of magnetization so that synchronizing pulses may be generated in a reading head 6 and applied therefrom to an amplifier 7. The output from amplifier 7 consists of sine wave pulses.

The disc or recording path 3 serves for the storage of data which may be applied thereto by a recording head 8 under control of incoming signals from any desired source. It will be understood that such signals may be recorded from time to time in accordance with any changes of statistical data and they are to be manifested as resettings of the indicators in a posting board. New recordings automatically erase old recordings when the applied magnetizing effect is strong enough to produce saturation of the lines of force in the spot areas of the recording path.

Immediately upon making any new recording on the element 3 it will be read out by a reading head 9 which will hereinafter be considered as the source of intelligence to be manifested on the indicator. A single train of 5-unit code signals may be recorded on the circumference of the disc or drum 3 and the position of orientation of each code signal will have reference to a particular indicator unit among as many such units as are comprehended in the posting board. A posting board of very large capacity, however, may utilize a plurality of recording paths 3 for different groups of indicators, each record path having operatively associated with it a different one of several reading heads 9.

The recording unit 2 serves for check-back purposes and has operatively associated with it a recording head 10 and a reading head 11. We shall again refer to these components 2, 10 and 11 when describing the check-back system in more detail.

An amplifier and discriminator unit 12 is shown to be controlled by the reading head 9 and will be understood to be of any well-known type such as to deliver a semi-cycle pulse output, the oppositely poled semi-cycles being suppressed. This discriminator delivers output pulses of negative polarity and they represent mark elements of the signal. In the absence of a pulse a space element is represented.

The indicator units

Figures 3, 4:
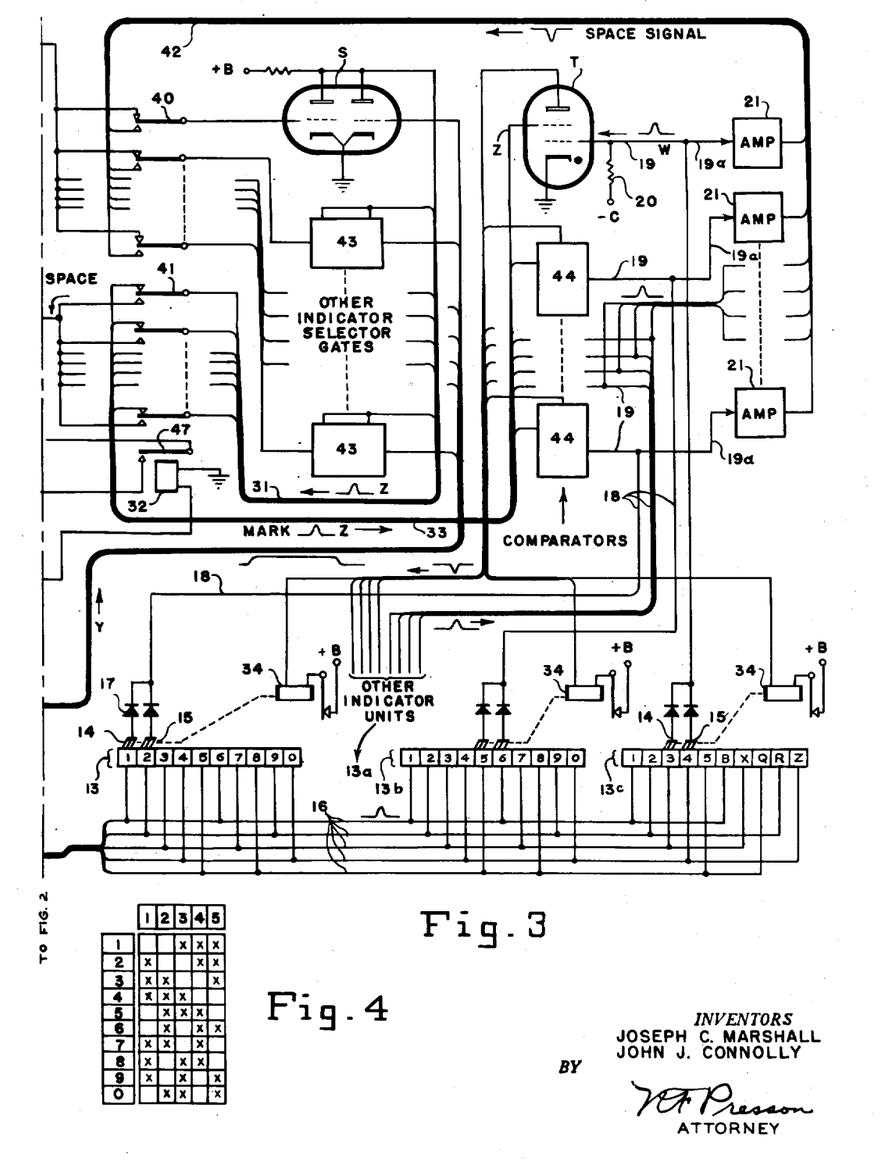
Fig. 4 is a chart of code signals which may be suitably employed for transmission of statistical data, storage thereof in a magnetic storage medium, and application from the storage medium to a comparator which in turn may be used to apply posting signals to one or more settable indicators.

In Fig. 3 we have shown several commutator-and-brush arrangements 13, 13a, 13b and 13c in developed form. Each of the indicator units to be comprised in a posting board is provided with a segmented commutator having, as shown, ten segments which are numbered from 1 to 9 inclusive and 0, or, as in the case of commutator 13c, the segments may represent the series 1 to 5 inclusive and the letters B, X, Q, R, Z. Any other letters may be chosen at will, if desired. These are simply illustrative markings that may be displayed by different orientations of a rotatable indicator.

Either the commutator 13 or the brushes 14 and 15 may be made rotatable with an indicator drum. In order to use the code combinations of a safety code such as shown in Fig. 4, it is essential that the brushes 14 and 15 shall rest upon adjacent segments of the commutator 13. Other codes, however, may be devised wherein the brushes need not rest upon adjacent segments.

The posting system as herein shown will be understood to include seven indicators for which the commutator and brush arrangement of indicators #1, #6 and #7 are drawn out in detail in Fig. 3, while the remaining 4 indicator units will be understood to be of the same type and character and are merely indicated as present in the space labelled 13a. The segments of the commutator are multiple-wired to buses 16, each of which corresponds to one of the elements of a code combination. The uppermost conductor in the group 16 may be considered to correspond with the first code element of a code signal, and the bottom-most bus is the 5th code element.

Each of the brushes 14 and 15 is connected to a rectifier element 17, and the circuits of the two brushes of a pair are joined in a conductor 18 which leads to two branches 19 and 19a. Branch 19 feeds through a resistor 20 to a source of grid bias potential indicated as —C. Branch 19a is the input circuit for an amplifier 21. At the junction between branch 19 and resistor 20 there is a connection to the #1 grid of a gaseous tube. This tube is of the so-called "thyratron" type and has a #2 grid which derives its control from a high anode potential in a tube S which is a twin triode tube and which must be blocked on both sides in order to deliver a triggering potential to the #2 grid of tube T.

The electronic counting rings

Figure 2:
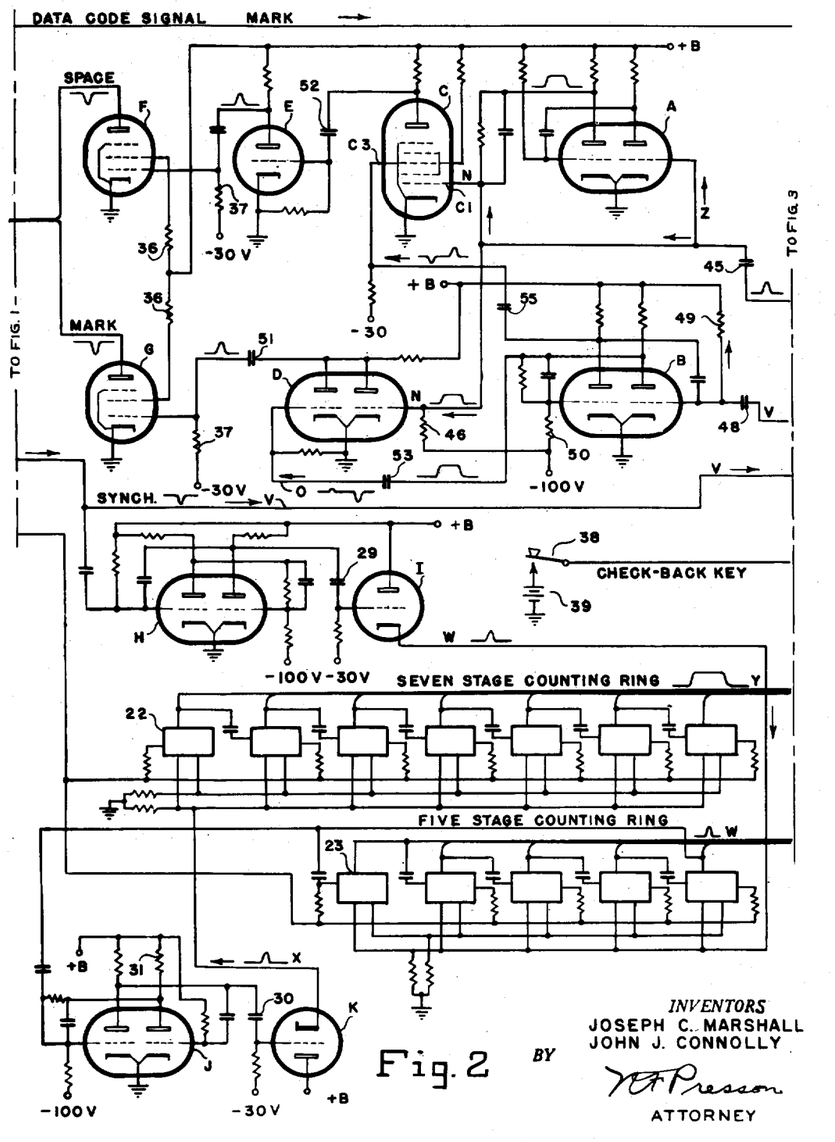

In the embodiment of our invention as herein disclosed, provision is made for recording on the magnetic storage medium a train of signals, each applicable to the setting of seven different indicators. The number seven is chosen merely by way of illustration since any desired number of indicators and positions for recording their signals on the magnetic storage medium may be had. Progressive selection of the indicators for setting purposes is the function of the 7-stage counting ring 22 as shown in Fig. 2. We have also provided a 5-stage counting ring 23, each stage of which will identify one of the five elements of a code signal. We have not shown, nor is it necessary to describe, the details of construction of electronic counting rings of this type since they are well known in the art. For those not familiar with them, reference is made to an article in the "Proceedings of the I. R. E.," issue of August 1947, page 756, entitled "Electronic Computing Circuits of the ENIAC," by Arthur W. Burks. Note particularly Fig. 1 on page 757. In the operation of a counting ring having flip-flop stages the #1 count is shown by resetting the first stage to a conductive state on its left side and by resetting of all the other stages to right side conductance. The subsequent application of counting pulses to the circuit causes a progressive resetting of one after another. Each stage when reset delivers a triggering control pulse to the next stage in the ring. After a cycle of pulses has been applied so as to trigger each of the stages from first to last, the last stage may cause the cycle to be repeated by again triggering the first stage to the condition which represents the #1 count.

As shown in the drawing, we utilize synchronizing pulses derived originally from the reading head 6 for control of the 5-stage counting ring 23. The "synch. pulse" circuit includes an amplifier 7 which applies pulses across a capacitor 24 and a resistor 25 to a —30 volt biasing source terminal 26. At the junction between capacitor 24 and resistor 25 there is a connection to the control grid of a triode tube L. This tube is normally biased to cut-off and responds to positive semi-cycles of the synchronizing pulses. When unblocked the fall of anode potential induces currents in the windings of a transformer 28 for the purpose of triggering another triode tube M. This tube has a control grid circuit which includes one winding of a transformer 28 and resistive and capacitive connections to a —30 volt source 26. The tube is, therefore, normally non-conductive. The secondary winding of transformer 28 is in the anode circuit in series with a resistor 27. A sudden burst of current flow in the output circuit of tube M is produced by unblocking tube L, the same as has been shown and described in the application of John J. Connolly, Ser. No. 104,791, filed July 14, 1949.

The counting steps to be performed by the 5-stage counting ring 23 must be timed to coincide with the delivery of code signal pulses as output from the amplifier and discriminator unit 12. Therefore, we employ a delay circuit consisting of a twin triode tube H and a cathode follower tube I for delaying the synchronizing pulse effect upon the operation of the 5-stage counting ring 23.

Tube H is normally conductive on the left side and, upon being triggered, will be restored to a conductive state on the left side after a certain time lapse which is determined by the circuit parameters associated with this tube. When the left side is cut off the right side becomes conductive, as is well known. The incident negative pulse through capacitor 29 has no effect. At the end of the delay period, however, the right-hand side of tube H is cut off and delivers a positive pulse to the control grid of tube I, the cathode of which then becomes more positive and delivers a positive pulse to the left-hand cathode in each of the flip-flop stages of the counting ring 23. Whichever one of these stages has a condition of conductance on the left side will be triggered to a non-conductive state, thereby raising its anode potential and causing the triggering of the next higher stage. This higher anode potential also serves to deliver a pulse to one of the five conductors in a cable W to which certain segments of the commutators 13, 13a, 13b and 13c are connected.

The entire synchronizing pulse train is terminated by an unmarked portion of its recording path 1. The gap introduced at this time serves to build up a striking potential on tube Q as a result of discontinuance of the synchronizing pulse control upon a triode tube P. The arrangement to tubes P and Q is the same here as was shown in the aforementioned application of John J. Connolly. Tube Q is of the "thyratron" type which delivers a so-called gap reset pulse. Its moment of striking is between the start and finish of reading the gap between successive synchronizing pulse trains. When tube Q strikes, it delivers a negative pulse to a normally conductive tube R and blocks this tube. Tube R is powered by a connection of its anode through a resistor 54 to ground and by direct connection of its cathode to a —150 v. source terminal. When tube R is blocked, a reset pulse at ground potential is applied to certain of the grids in the flip-flop stages of both counting rings 22 and 23.

These reset pulses are applied to the left-hand grid of the first stage in each of the counting rings, and to the right-hand grid in all the other stages. Therefore, at the outset of reading the synchronizing pulses the first stage of each of these counting rings will be brought to a condition of left side conductance, thus assuring that the counting operations will commence with a #1 count when the signals and the synchronizing pulse train are read from the magnetic storage medium.

The counting ring 23 controls counting ring 22 each time it completes a cycle of five synchronizing pulses. We find, however, that it is necessary to introduce some delay in the triggering of the 7-stage counter after the 5-stage counter restores itself to a count of "1." This delay of control is obtained by the use of tubes J and K, which are similar in their circuit arrangements to those of tubes H and I. In other words, when tube J, normally blocked on its left side, is rendered conductive by a positive pulse from the #5 stage of counting ring 23, the right hand side of tube J becomes momentarily blocked.

The self-restoration of tube J after a certain delay period results in the restoration of a blocked state on the left side and the delivery of a positive pulse which is applied through capacitor 30 to the control grid of cathode follower tuke K. The cathode in tube K is then driven to a positive value. A resistor 31 is common to the cathodes on the left-hand side of each of the stages of counting ring 22, and to the cathode of tube K. These left-hand cathodes in ring 22 are, therefore, raised to a potential which is high relative to their associated grids. Any flip-flop stage the left side of which was at that moment conductive will now be blocked. No change will occur in the other stages, except the stage next following, this stage being then triggered by the positive output pulse from the preceding stage. Thus, it will be seen that upon completion of each count of 5 synchronizing pulses by the counting ring 23, the 7-stage counting ring 22 will receive a counting pulse and will advance its count representation.

The comparator

Each of the left-hand anodes of the digital stages in counting ring 22 has a separate connection through cable Y to different ones of a plurality of gate tubes S and 43, and to the right-hand grids therein. So tubes S and 43 are progressively conditioned while the 7-stage counting ring 22 takes its counting steps. The conditioning is to select one at a time of tubes S and 43 to act as a gate, provided that they simultaneously receive a negative (mark) message signal pulse U from the amplifier and discriminator unit 12.

Twin triode tube S is individual to the setting mechanism for one particular indicator. This tube has associated with it a gaseous comparator tube T which is of the tetrode type. Tube T is triggered under simultaneous control by potentials applied to its #1 and #2 grids. Its #1 grid is connected to the brushes 14 and 15 of the commutator-brush arrangement associated with the indicator in question. Its #2 grid is normally connected to the anodes of tube S and is driven positive when tube S is completely blocked. The tripping of tube S is perfected by the application of a steady cut-off bias potential applied to the grid of its right-hand triode section whenever it is selected by one of the stages of the 7-stage counting ring 22.

When reading head 9 reads the stored signals from the magnetic storage medium 3 they are applied as input to the amplifier and discriminator unit 12. The output from this unit is a negative pulse which represents a mark element of the code signal. This negative pulse is labeled U and is applied directly to the control grid in the left-hand triode section of tube S. The negative bias potential, say from stage I of the counting ring 22, is labeled Y and is applied to the control grid in the right-hand triode section of tube S.

The effect of cutting off tube S is, therefore, to apply a positive pulse from its common anode connection through one of the conductors in cable 31 and thence through one of the movable contacts and a back contact of relay 32 to a conductor in cable 33 which leads to the #2 grid in tube T. The pulse which is transmitted through this circuit has been labeled Z and represents the application to the tube T of a mark element of a code signal.

Whenever a space-element of a code signal as recorded on the magnetic storage medium 3 is read out, its effect is suppressed in the amplifier and discriminator unit 12. Consequently, it will be skipped during the counting pulse periods as defined by the counting ring 23. In this case, tube S will not be completely cut off and the voltage applied to the #2 grid of tube T will remain below the ignition level.

It was mentioned above that the counting ring 23 counts the delayed synchronizing pulse output from the cathode follower tube I; also that buses 16 are successively energized with high anode potentials as the count progresses from "1" through "5." If either of the brushes 14 or 15 happens to rest on a segment 13 when the latter receives a positive pulse from the counting ring 23, then such a pulse is fed through conductor 18, 19 and a resistor 20 and is applied to the #1 grid of tube T for purposes of comparison with a simultaneous application of a mark-pulse to the #2 grid of tube T, as derived from tube S.

The triggering of tubes T and 44 is to be performed only when a mark signal element derived from the magnetic storage device and a space signal element derived from a commutator-brush arrangement occur simultaneously; that is, when the code patterns fail to dovetail. Conversely, if the two code patterns are in agreement, then, for each of the five code elements as defined by the counting ring 23, one or the other of the two grids in tube T will be driven positive, but not both together. In this event tube T or one of tubes 44 will not be triggered during any one of the five counts of the counting ring 23, which would mean that the indicator is then set to a position to indicate the significance of the stored signal.

The purpose of the one-way conductors or rectifiers 17 is to avoid improper feed-back of positive pulses from one to another of the buses 16. Such positive pulses emanate from the left side of the particular counting stage which represents the instant count from 1 to 5. On each of these counts, two non-adjacent segments of each commutator distributor are raised to a high potential level. For the #1 count the segments are 1 and 6, for the #2 count they are 2 and 9, for the #3 count they are 3 and 7, for the #4 count they are 4 and 0, and for the #5 count they are 5 and 8. Brushes 14 and 15 move together over adjacent pairs of segments whenever the stepping mechanism of the indicator is actuated.

If the settings of brush 14 on each of the numbered segments of commutator 13 be referred to the code chart of Fig. 4, it will be seen that each of the ten code patterns for the different indicator settings provides a location for two code elements of "space" significance on the two adjacent segments 13 which are contacted by the two brushes 14 and 15. So the standing of brushes 14 and 15 on two adjacent commutator segments may be considered to represent space elements of a permutation code. Three other segments, in addition to these two on which the brushes rest, may be considered marking elements of the code.

Our method of making direct comparisons between the code representation of the brushes and the code signal elements derived from magnetic storage includes sequential testing of the difrent code elements from 1 to 5 as the counting ring progresses through its cycle. If at any point the two codes do not agree, then tube T is triggered and causes a pulse to be transmitted to the magnet 34 of the stepping mechanism, thereby causing the indicator to move through one step. Then this comparison operation is repeated a sufficient number of times to step the indicator around and thus to bring about an agreement between the two codes, it will be found that the two brushes 14 and 15 rest upon segments which have a "space" significance and which provide a dovetailing of space-pulses with mark-pulses as applied to grids #1 and #2 of tube T. At this time, therefore, the indicator will come to rest and will remain so set until some different code signal is read out from magnetic storage.

The cadence of operations of the stepping mechanism is determined by the revolution speed of the magnetic storage member. No more than nine revolutions are necessary for any complete setting of an indicator. During any one revolution, however, it is possible to provide single setting steps for each one of the indicators.

It will be noted that comparisons are made only between the mark elements of the magnetically-stored signals and space elements as defined by the orientation of the brushes 14 and 15 with respect to the commutator 18. The mark-representing positions of the commutator segments cannot be compared with space signals from magnetic storage, and there is no need to do so, provided that a safety code such as shown in Fig. 4 is utilized.

Another matter to be noted is that, in making single code signal comparison as above described, there may be two points of coincidence between a mark element of the stored signal and a space element of the brush setting. Under practical operating conditions, however, the two coincidences occurring in a single scanning of the five elements of a code signal would be incapable of generating two discrete pulses of output from the gaseous tube T. At practical speeds of scanning each code element may be scanned in approximately two milliseconds or less. Therefore the maximum lapse of time between two coincidences is 8 milliseconds, which is not sufficient to allow for extinguishing the gaseous discharge before the second attempt to ignite it. So the setting mechanism is never allowed to over-step during a single revolution of the magnetic storage member.

The check-back system

In some applications of our invention it is required that information be transmitted back to the original source of the intelligence that was recorded on the magnetic storage medium 3. It is possible, however, to utilize our invention for other purposes wherein the indications, as appearing from time to time on the indicator, may be translated into permutational code signals by way of responding to an inquiry. In the embodiment of our invention as herein disclosed, it is arranged to first record on secondary storage, such as the storage medium 2, a complete record of code signals representing the current settings of all indicators. These may then be read out at will by a reading head 11 for the purpose of keying a check-back transmitter. Recording on the secondary record path 2 is performed by means of a recording head 10 having a center-tapped winding which is connected to a +B source terminal. The two outside terminals of the recording head 10 are carried through a cable 35 to respectively different anodes in tubes F and G which are preferably of the pentode type. The cathodes, as well as the suppressor grids of these tubes, may be grounded. The screen grids have a suitable positive potential applied thereto through resistors 36 and connections from these resistors to the +B source terminal. The control grids for tubes F and G are both normally biased to cut-off, say by connections through resistors 37 to a −30 v. source terminal. A positive control pulse may be applied to the control grid of either one of the tubes F and G, but not both together, thereby to give polarity significance to the magnetizing effect of the recording head 10.

Recording of the check-back signals is accomplished by operation of a check-back key 38 which may be operated at will. This key, when closed, feeds operating current from a battery 39 to the winding of relay 32 and causes all of its movable contacts 40 and 41 to close against stationary front contacts. While relay 32 is operated the U-pulses (mark signals from primary storage) are prevented from reaching the left hand grids of the gate tubes S and 43. The front contacts associated with movable contacts 40 are individually connected through cable 42 to output circuits of respectively different amplifiers 21. These amplifiers each have an input circuit 18a which is individual to a connection from a respective one of the brush sets 14—15 of different indicators.

The positive pulses which are derived from the 5-stage counting ring 23, and which are fed through any of the segments of the commutator 13 on which brushes 14 and 15 may rest, are now inverted by the amplifiers 21 and become negative control pulses as applied to the left-hand control grids in tube S and 43 for different indicators. Tubes S and 43 are selected sequentially in accordance with the operation of the 7-stage counting ring 22, the same as when utilizing the message signals from primary storage for indicator setting purposes. As counting ring 23 goes through its cycle it delivers a positive pulse to each of the buses 16, but only those commutator segments on which brushes 14 and 15 may rest will pass pulses through to the amplifiers 21, and thence to the different conductors in cable 42 and the movable contacts 40, to the control grids of the left side of gate tube S and 43. The pulses so applied are negative and partially block these gate tubes. But only one of them is fully blocked at any one time, such as when it receives a negative (cut-off) bias on its right hand grid during the time of one count in the 7-stage counting ring 22.

The recording of check-back signals on the track of recording member 2 may commence at any part of the revolution cycle, depending upon the instant when key 38 is closed. The correct linear position along the track will be automatically determined by the functioning of the gap reset pulse circuit, including tubes P and Q, and by the operation of the counting rings. If the key 38 is held closed for longer than one revolution (as it should be to insure making a complete record of all indicator settings) the repeated check-back signals will be merely a confirmation of those that preceded them. In fact, the key 38 may be held closed during several revolutions of the magnetic recording medium without detriment to the operation of the system.

As the record tracks are scanned by the synchronizing pulse reading head 6, and the secondary storage recording head 10, each 5-element code signal will be recorded in its proper place corresponding to one of the indicator settings. If gate tube S has both of its triode sections cut off, a positive pulse will be delivered from its common anode connection through one of the conductors in cable 31, thence through a movable contact 41 of relay 32, through a capacitor 45 and through a resistor 46 to a −100 v. source terminal.

Between capacitor 45 and resistor 46 there are control grids to be biased one way or another in three tubes, A, C and D, these being the right-hand grids of tubes A and D and grid C1 in tube C.

Tube A represents a delay circuit which is tripped only in response to the application thereto by tube S or by one of tubes 43 of a positive pulse representing a space element of the code signal. In the absence of a space pulse, tube D functions to control tube G so as to record a mark pulse.

*Mark-pulse recording of check-back signals*

Tube D is a twin triode which is normally blocked on its right-hand side and is normally conductive on its left-hand side. In order for the tube to function in the transmission of a mark signal for control of tube G, both of its triode sections must be simultaneously cut off. When this occurs tube G, which is normally non-conductive, will then become momentarily conductive and will apply a recording pulse to the recording head 10 for fixing a spot of magnetization of proper polarity on the record track 2 representing a mark element of a code signal. This operation results from the utilization of a synchronizing signal for controlling tube B as follows:

The synchronizing pulses V are applied through contact 47 of operated relay 32 directly to the right-hand grid of tube B and prior to the synchronizing pulse output from tube I, the latter having a delayed effect upon the stepping of the counting ring 23. The space signal pulses which emanate originally from counting ring 23 and traverse brushes 14 and 15 to the amplifiers 21 (whereat they are inverted) then apply their controls to the left-hand grid of tube S an instant later than when tube B responds to the synchronizing pulses.

Tubes A and B operate as "one-shot multivibrators." Their time constants for restoration after being triggered may be substantially the same. At any rate, allowance being made for the delay action of the delay tube H, if tubes A and B are both triggered, tube B is arranged to recover its normally conductive state on its right side while tube A is still blocked on its left side. The high potential on the left-hand anode in tube A now holds the right-hand grid in tube D at a bias level such as to maintain conductance on its right side. Therefore, in the presence of a space signal, tube D will not be completely blocked upon application to its left-hand grid of a differentiated negative pulse 0 from the right-hand anode of tube B when the right-hand section of the latter recovers its normally conductive state.

The preceding paragraph explains how, despite the periodic triggering of tube B in response to every synchronizing pulse, the useful effect of this triggering upon tube D is obtained only in the absence of a triggering of tube A, as when the space signal is applied thereto. This follows from the fact that when no space signal triggering of tube A occurs, the left hand anode potential therein is low and holds the right-hand grid in tube D at a cut-off bias. In this case tube D is enabled to be completely blocked by a negative pulse through capacitor 53 and applied to its left-hand grid. Tube G then receives a positive control pulse on its No. 1 grid and on being driven conductive its space path current also traverses the half-winding of recording head 10 approximately for recording a mark pulse.

*Space-pulse recording of check-back signals*

It was mentioned above that the space pulse Z, as derived from one of the tubes S or 43, traverses capacitor 45 when relay 32 is operated, and is applied to certain grids in tubes A, C and D. The effect of this pulse upon tube A is simply to trigger it and to allow it to restore itself after a certain time lapse. But tube A is depended upon to prolong the effect of the space signal so that it will overlap the instant of restoration of tube B to the normally blocked condition on its left side.

When tube B restores itself to normalcy it delivers a positive differentiation pulse through capacitor 55 to grid C3 in tube C. This occurs while grid C1 in tube C is being held positive, which is during the period of the triggered state of tube A. Hence tube C is now driven to a conductive state and gates the space pulse (with some delay) as a negative signal to be applied to the control grid of tube E.

Tube E is normally conductive, but is blocked by the last mentioned negative signal. In consequence tube F receives a positive pulse on its #1 grid and becomes conductive, thus forming an electronic circuit closure for exciting the half-winding in recording head 10 suitably for recording a space-element of the code signal.

It will be noted that when tube A is triggered for recording a space signal its so-called "pulse-stretching period" commences before and ends after the moment when tube B restores itself to normal. This mode of operation effectively prevents a gating action in tube D when recording a space pulse. Furthermore, since the differentiated pulses delivered by tube B upon restoring itself to normal are applied positively to grid C3 of tube C and negatively to the left-hand grid of tube D, and since these pulses are delivered simultaneously, it follows that either a space signal or a mark signal will be recorded at every recording spot along the path of the recording medium 2, and that the identical spot will be magnetized regardless of the polarity of the recording head.

Thus the check-back recording circuit, as shown in Fig. 2 and as described above, is effective to record all five code elements of each code signal representing the current setting of an indicator, each code signal being composed of three marking elements and two spacing elements. And yet the space signals as identified by the standing of brushes 14 and 15 on certain adjacent segments of commutator 13 are alone sufficient to determine the code signal pattern. The elements which are not space signals must be mark signals.

*The timing of controls*

Figure 5:
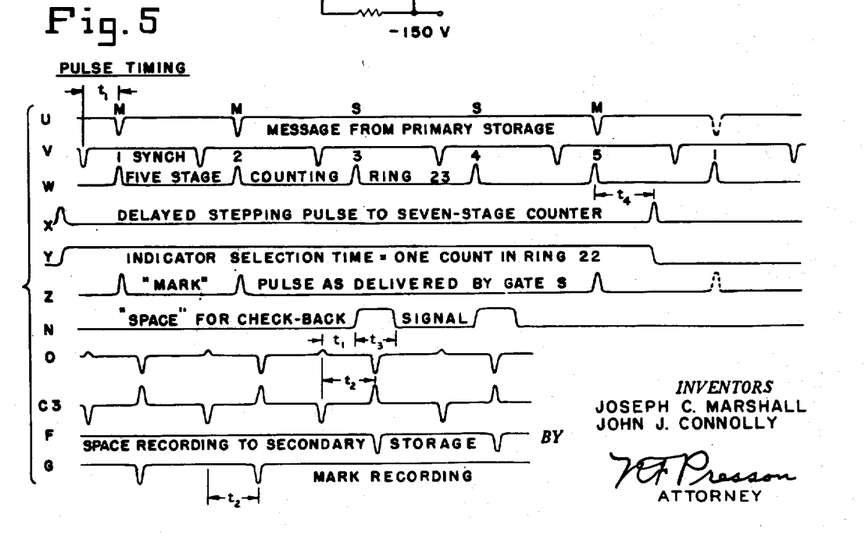
Fig. 5 is a timing diagram showing certain relationships of sequential operation with respect to different components of the electronic circuit of our posting system.

Fig. 5 shows a number of graphs representing pulse times incident to the operation of the entire system. A typical example is given of reading a permutational code, or "message," from the primary storage record 3. This graph is labeled U, the same as on the circuit diagram nd assumes that the 5-unit code is MMSSM. It will be noted that there is a certain delay in the output from the unit 12 as compared with the actual time of reading the record under a scanning operation of the reading head 9. This delay is represented as a time interval $t_1$. The synchronizing pulses as shown in Graph V are applied to tubes B and H without delay, but tube I introduces delay equal to $t_1$ in the delivery of pulses labeled W, these pulses being applied to the counting ring 23.

Graph X represents a stepping pulse which is applied to the 7-stage counter 22 after a delay period labeled $t_4$ with respect to the #5 counting pulse of the counting ring 23. The delay period $t_4$ is introduced as a function of the delay tube which controls cathode follower tube K. Each time that tube K is rendered conductive a control pulse X is applied to the 7-stage counting ring and steps it along from one stage to another. These steps, however, have a persistent effect equal to a full cycle of the counting ring 23, in order that one after another of the tubes S and 3 shall remain standing in a partially blocked condition for selective response to successive 5-unit code signals. This standing condition is represented by the graph Y for one stage of the 7-stage counter.

Graph Z and graph U are the same except for reversed polarities of their pulses. They represent illustratively the reading of a code signal MMSSM. Graph N represents the application of positive pulses delivered as output from the left side of tube A in the presence of a space signal as used for check-back recording. The duration $t_3$ of this positive pulse is one which enables it to straddle a control pulse derived from the termination of the triggered state in tube B. Therefore, in the presence of the check-back signal, tube D is prevented from being operated to deliver a mark pulse when tube C is driven conductive for the delivery of a space pulse.

Graph O is a representation of pulses delivered across capacitor 53 under control of tube B, these pulses being applied to the control grid of the left-hand triode section of tube D. The positive pulses are small in comparison with the negative pulses due to the cathode bias which is normally impressed on the left-hand grid of tube D. These positive pulses have no effect. The negative pulses delivered after a delay period labeled $t_2$ are controlling and cause tube D to be entirely cut off in the absence of a space signal.

Graph C3 represents the application of negative and positive pulses to grid C3 in tube C at the start and finish of the pulse-stretching interval produced by tube B. The negative pulses have no effect because grid C3 is normally biased to cut-off. The positive pulses are effective in producing conductance in tube C only when a positive pulse is simultaneously applied to its grid C1, as when the space signal is to be recorded.

Graph F represents the anode potential in tube F; its negative dips being responses to signal control as above described and being effective for recording space signals on the secondary storage track. It will be remembered that these space pulses are negative as delivered across capacitor 52 to tube E and they occur after a delay interval $t_2$ as measured from the synchronizing pulses.

Graph G represents the anode potential in tube G. Its negative dips occur when tube B has completed its pulse-stretching period and delivers a negative pulse to the left hand grid of tube D thereby to block this triode section, the right hand section being already blocked. The resultant operation is to deliver a positive pulse through capacitor 51 to the control grid of tube G and to cause the recording of a mark signal.

Recapitulation

It will be apparent to those skilled in the art that the number of indicators to be included in a system such as we have described may be much greater than the number seven, which was used merely for purposes of illustration. Any number of recording spaces on the magnetic storage medium may be provided within reasonable limits for individual identification and selection of different indicator units. Furthermore, if code signals having more than 5 elements were to be employed, then the number of selectable setting positions for the indicators may be greater than 10. Still again, it is feasible to utilize a plurality of message storage tracks on a rotatable drum, each track being scanned by a separate reading head 9. Thus the control of different groups of indicator units may be made concurrently even though there is only one source of synchronizing pulses.

The advantageous features of our invention will be well appreciated by those skilled in the art. A noteworthy advantage lies in the provision for very rapid scanning of the stored intelligence and for obtaining concurrent indicator setting controls without any intermediate storage. Thus the appreciable time that is required to set an indicator electro-mechanically from one position of orientation to another is no hinderance to the signal scanning speed. The setting operation for different indicators will oftentimes be overlapping during the scanning of a message train from the storage unit 3. Any change of record such as may be introduced by means of new recordings applied to the recording head 8 will result in an immediately following read-out of control signals for resetting the appropriate indicators.

Considerable modification of the electron tube components and their circuit parameters for adaptation of our system to different requirements may readily be made by those skilled in the art, but without departing from the spirit of the invention. We do not, therefore, intend to limit the scope of the claims merely to the illustrative embodiment herein shown and described.

We claim:

1. In combination, an indicator settable to different positions to manifest the significance of different character code signals, a commutator-and-brush arrangement operatively coupled to the indicator for signifying its orientation, a comparator and a step-by-step setting mechanism operatively associated with the indicator, a cyclically operable item storage device having a magnetic recording track, means for serially recording the character code signals on said track, read-out means including an electronic counting ring for serially and repetitively applying individual character code signals to said comparator, a synchronizer under control of the cyclic operation of said storage device, synchronizing pulse responsive means for coordinating the functioning of the comparator with a particular character recording position on the track of said storage device, and means for causing said comparator to initiate a step to be taken by its associated setting mechanism whenever the functioning of that comparator shows a lack of similitude as between the mark-space pattern of a character code signal to which the comparator responds and the code element pattern which is signified by the instant orientation of said commutator-and-brush arrangement.

2. In a data storage and indicating system, a constantly rotatable magnetic storage medium having record tracks for primary and secondary records of coded data, recording and reading devices operatively associated with said medium, a plurality of associated settable indicators respectively for displaying a plurality of characters representing the data stored in the primary record track, electronic translating means under control of said reading devices for causing each of said indicators to move step-by-step into a position to display a character representing a magnetically recorded item to which it pertains, the steps of said indicator movements being one per revolution of said medium, means for terminating the stepping movements of each indicator when its indication is brought into agreement with the correlatively stored item, and check-back means operable at will for injecting into said secondary record track coded items corresponding to the setting of each indicator.

3. A data posting system comprising a plurality of indicators each settable to display different numerals or other characters according to selection, a magnetic record medium having a record track for coded data characters respectively to be displayed on said indicators, the codes for said characters being disposed serially on a single track, a source of synchronizing pulses disposed serially on another track on the record medium, read-out devices operatively disposed with respect to said tracks, means controlled by the synchronizing pulses read out for distributing activating pulses in timed sequence to the indicators to cause them to respond to the proper character code pulses whereby the setting of each indicator is controlled by an appropriately read character code, and code translating means responsive to joint control by said read-out devices and said synchronizing means for producing step-by-step setting movements in each indicator until agreement is reached between its character indication and the meaning of the corresponding character that is read out from the record medium.

4. A system according to claim 3 and including in the last said means a comparator and a segmented commutator-and-brush arrangement operatively associated with the rotor of each indicator, the segments of said commutator on which a plurality of brushes currently rest being indicative of the orientation of that indicator, said comparator being operative to sense the coincidence of a mark element when applied thereto from the read-out, and a correlative space element of a code the pattern of which is determined by the brush positions with respect to said commutator.

5. A system according to claim 4 and including a second record track for coded data characters on said magnetic record medium, recording means operatively disposed with respect to this second track, a signalling device under control of said commutator for transmitting signals to said recording means, and means operable at will for initiating such operation of said signalling device as will effect a recording of code signals on said second track in conformity with the current setting of each indicator, said last named means including the means controlled by the synchronizing pulses for activating the segments of the commutators of the indicators successively to control the recordings of the code signals on said second record track for coded data characters.

6. In a system of the class described, that is, where transmitted code signals are used to control an indicator setting device, a commutator-and-brush device operable in conjunction with the orientation of the indicator for deriving a code pattern which defines the indicator's instant setting, a comparator arranged and adapted to sense the coincident application thereto of a mark element and a space element, one of said elements being amongst those of said code signals which are progressively received, and the other of said elements being amongst those of said code pattern, means including circuit connections from said comparator to said setting device whereby the setting device is caused to function in response to the sensing of said mark-space coincidence, and means for causing progressive and repetitive tests to be made by the comparator with respect to each comparable element of the received code signal until the reorientation of said indicator cancels the condition of said mark-space coincidence throughout a complete scanning of said code pattern.

7. The combination according to claim 6 and including a magnetic storage medium for transmitting said code signals repetitively.

8. In a system for composing permutation code signals representative of the orientation of a drum-type indicator, a commutator-and-brush device operably associated with said indicator, means for applying pulses to certain segments of said device in one predetermined sequence, means for simultaneously applying the same pulses to other segments of said device in a different predetermined sequence respecting their serial arrangement, means responsive to the pick-up of said pulses whenever conveyed thereto by virtue of brush contact with a segment to which the pulse is applied, a source of periodic pulses, representative of code elements of a sense contra to the sense of the first said pulses, and code composing means operable under control of said responsive means to dovetail together a fixed number of code elements of each respective sense but in different patterns which depend upon the standing of brushes or particular segments of said device, said code composing means being arranged and adapted to synthesize each permutation of code elements by inclusion therein of the brush-traversing pulses wherever they occur in the sequence of pulse periods, and by substitution of the pulses of opposite sense when the pick-up pulses are absent.

9. The combination according to claim 8 and including a magnetic recorder for storing the output from said code composing means.

10. The combination according to claim 8 and and including an electronic counting ring operable at the cadence of said periodic pulses, said counting ring having as one of its functions to control the rate of sequential application of pulses to different segments of said device.

11. The combination according to claim 10 and including a second counting ring arranged for stage-by-stage counting at a rate equal to complete cycles of counting by the first said ring, this second ring being operable to successively activate different ones of a plurality of said pickup pulse responsive means which are operatively associated with different ones respectively of a plurality of indicators and their commutator-and-brush devices.

JOSEPH C. MARSHALL.
JOHN J. CONNOLLY.

REFERENCES CITED

The following references are of record in the file of this patent:

UNITED STATES PATENTS

| Number | Name | Date |
|---|---|---|
| 2,096,954 | Bellamy et al. | Oct. 26, 1937 |
| 2,132,684 | Gardner | Oct. 11, 1938 |
| 2,202,392 | May et al. | May 28, 1940 |
| 2,224,244 | Hicks | Dec. 10, 1940 |
| 2,302,759 | Haselton et al. | Nov. 24, 1942 |
| 2,397,604 | Hartley et al. | Apr. 2, 1946 |